United States Patent [19]

Okishi

[11] 4,253,999

[45] Mar. 3, 1981

[54] AGENT FOR PROTECTING THE SURFACE OF LITHOGRAPHIC PRINTING PLATE COMPRISING A PLASTICIZER CONTAINING OIL PHASE AND A SURFACTANT AND A HYDROPHILIC HIGH MOLECULAR WEIGHT COMPOUND CONTAINING AQUEOUS PHASE

[75] Inventor: Yoshio Okishi, Shizuoka, Japan

[73] Assignee: Fuji Photo Film Co., Ltd., Minami-ashigara, Japan

[21] Appl. No.: 52,048

[22] Filed: Jun. 25, 1979

[30] Foreign Application Priority Data

Jun. 23, 1978 [JP] Japan .................................. 53-76164

[51] Int. Cl.[3] .......................... C08L 3/02; C08L 5/04; C08L 5/00

[52] U.S. Cl. .................................. 260/17 R; 101/465; 101/466; 106/2; 106/14.5; 252/312; 260/17.4 ST; 260/9; 260/17.2; 260/17.3; 260/13; 260/14; 260/15; 260/16; 260/29.6 WB; 260/29.6 HN; 260/29.6 M; 260/29.6 E; 260/31.2 R; 260/31.8 R; 427/144; 427/145

[58] Field of Search ........................ 260/17 R, 17.4 ST

[56] References Cited

U.S. PATENT DOCUMENTS

| | | | |
|---|---|---|---|
| 3,615,791 | 10/1971 | Thomas et al. | 101/465 |
| 3,666,502 | 5/1972 | Erikson | 101/465 |
| 3,679,479 | 7/1972 | Ray et al. | 101/466 |
| 4,033,919 | 7/1977 | Lawson | 260/29.6 TA |
| 4,116,896 | 9/1978 | Garrett et al. | 260/17 R |
| 4,162,920 | 7/1979 | Gillich | 106/14.5 |

FOREIGN PATENT DOCUMENTS

| | | | |
|---|---|---|---|
| 1135334 | 12/1968 | United Kingdom | 101/465 |

*Primary Examiner*—Edward M. Woodberry
*Attorney, Agent, or Firm*—Sughrue, Rothwell, Mion, Zinn and Macpeak

[57] ABSTRACT

An agent for protecting the surface of a lithographic printing plate which is an emulsion comprising an oil phase containing a plasticizer having a solidifying point of 15° C. or less and a surfactant, and an aqueous phase having dissolved therein a hydrophilic high molecular weight compound.

73 Claims, No Drawings

AGENT FOR PROTECTING THE SURFACE OF LITHOGRAPHIC PRINTING PLATE COMPRISING A PLASTICIZER CONTAINING OIL PHASE AND A SURFACTANT AND A HYDROPHILIC HIGH MOLECULAR WEIGHT COMPOUND CONTAINING AQUEOUS PHASE

BACKGROUND OF THE INVENTION

1. Field of the Invention

This invention relates to an agent for protecting the surface of a lithographic printing plate, especially to an emulsion type plate protective agent.

2. Description of the Prior Art

The final step of the process of making a lithographic printing plate is generally referred to as a gumming step since the plate is coated with a gumming solution to protect the non-image area (which retains water and repels the greasy printing ink). While the primary purpose of gumming is to desensitize or increase the hydrophilicity of the non-image area of the lithographic printing plate, it has other purposes. Namely, to prevent possible deterioration of the lithographic printing plate during the period between making the plate and printing or during the period when printing is interrupted; to prevent the non-image area from becoming receptive to printing ink due to sebum on fingers and other foreign matter during handling of the lithographic printing plate such as when it is set on a printing machine; and to prevent development of scratches and other flaws on the non-image area or image-area (which repels water and accepts printing ink) during handling of the plate.

Among gumming solutions of the conventional type, the most effective one is a gumming solution of an emulsion type which comprises an oil phase having dissolved in a petroleum fraction a lipophilic substance such as a lipophilic surfactant soluble in an organic solvent and an aqueous phase having a water soluble dextrin dissolved therein. When this type of gumming solution is used to gum a plate for lithographic printing, the image-area is protected by the lipophilic substance in the oil phase whereas the non-image area is protected by the water soluble dextrin in the aqueous phase. As a result, the lipophilicity of the image-area decreases only slightly even if it is in contact with the water soluble dextrin.

However, this emulsion type gumming solution is unable to completely prevent a decrease in the lipophilicity of the image area, and it is not as effective in desensitizing the non-image areas as expected. In addition, the lipophilic substance which precipitates as a result of evaporation of the petroleum fraction stains the non-image area. Furthermore, since the petroleum fraction is volatile, the gumming solution emits strong odors which is intolerable in a working environment.

SUMMARY OF THE INVENTION

It is therefore one object of this invention to provide an improved emulsion type plate protective agent.

It is another object of this invention to provide an agent for protecting the surface of a lithographic printing plate which is highly effective in desensitizing the non-image area and yet does not decrease the lipophilicity of the image-area of the printing plate.

It is still another object of this invention to provide an agent for protecting the surface of a lithographic printing plate which does not stain the non-image area.

It is a further object of this invention to provide an odorless agent for protecting the surface of a lithographic printing plate.

As a result of various studies in search for an emulsion type gumming solution which achieves the above defined objects, it has been unexpectedly found that these objects can be accomplished by substituting an oil phase containing a plasticizer having a solidifying point of 15° C. or less for the oil phase of the conventional emulsion type gumming solution which comprises a petroleum fraction which has dissolved therein a lipophilic substance. Therefore, this invention provides an agent for protecting the surface of a lithographic printing plate which is an emulsion comprising an oil phase containing a plasticizer having a solidifying point of 15° C. or less and a surfactant, and an aqueous phase having dissolved therein a hydrophilic high molecular weight compound.

DETAILED DESCRIPTION OF THE INVENTION

The plasticizer which is the most characteristic feature of the plate protective agent of this invention constitutes the oil phase of an emulsion and is required to solidify at a temperature lower than about 15° C. Such plasticizer can be selected from what are generally called low-molecular-weight plasticizers. The plasticizers used in this invention boils at atmospheric pressure at a temperature which is preferably at least about 200° C., more preferably at least 300° C. Examples of the preferred plasticizer include a phthalic acid diester such as dibutyl phthalate, diheptyl phthalate, di-n-octyl phthalate, di(2-ethylhexyl)phthalate, dinonyl phthalate, didecyl phthalate, dilauryl phthalate or butylbenzyl phthalate; an aliphatic ester of a dibasic acid such as dioctyl adipate, butylglycol adipate, dioctyl azelate, dibutyl sebacate, di(2-ethylhexyl)sebacate, or dioctyl sebacate; an epoxidized triglyceride such as epoxidized soybean oil; a phosphate ester such as tricresyl phosphate, trioctyl phosphate or trischloroethyl phosphate; and a benzoic ester such as benzyl benzoate. Particularly preferred are dioctyl adipate, dibutyl sebacate and dioctyl azelate which give off the least odor and can be handled with maximum safety.

According to this invention, these plasticizers can be used independently or as a mixture and in either case, they are used in an amount within the range of from about 0.1 to about 10 wt%, preferably from 0.5 to 5 wt%, based on the total weight of the plate protective agent. As the amount of the plasticizer to be used decreases to less than 0.1 wt%, the resulting plate protective agent will lose its stability as an emulsion and it also decreases the lipophilicity of the image area of a lithographic printing plate. On the other hand, as the amount of the plasticizer increases to greater than 10 wt%, more plasticizer will stick to the image area and, as a result, the image area becomes so greasy to the touch that the lithographic printing plate coated with such protecting agent is difficult to handle.

The oil phase of the protective agent according to this invention preferably contains dissolved therein a lipophilic substance for the purpose of enhancing the stability of the protective agent in the emulsified state and minimizing the potential decrease in the lipophilicity of the image area. A preferred lipophilic substance is one which is conventionally used as a vehicle for a lithographic printing ink. Specific examples of the suitable lipophilic substance include a novolak phenolic resin such as a phenolformaldehyde resin, cresol-formaldehyde resin or tertbutylphenol-formaldehyde resin; a xylene resin prepared by condensing phenol and xylene with formaldehyde; a resin prepared by condensing phenol and mesitylene with formaldehyde; polyhydroxystyrene; brominated polyhydroxystyrene; cashew resin; partial esterified product of a copolymer of styrene and maleic anhydride; melamine resin; alkyd resin; polyester resin; epoxy resin; rosin or modified rosin such as hydrogenated rosin or rosin ester; and a petroleum resin such as gilsonite. A novolak phenolic resins, rosin or modified rosin are preferred. Other examples of suitable lipophilic substances include an aliphatic carboxylic acid having 5 to 25 carbon atoms such as oleic acid, lauric acid, valeric acid, nonylic acid, capric acid, myristic acid and palmitic acid, as well as castor oil. Whether used independently or as a mixture, these lipophilic substances are used in an amount within the range of from about 0.05 to about 5 wt%, preferably from 0.1 to 1 wt%, based on the total weight of the protective agent.

The oil phase of the plate protective agent of this invention contains a surfactant which functions as an emulsifying agent for providing a stable emulsion consisting of the oil phase and an aqueous phase which will be described hereafter. The surfactant is present in the oil phase as it is substantially dissolved therein. A suitable surfactant can be selected from a wide range of surfactants which include a nonionic surfactant such as polyoxyethylene alkyl ether, polyoxyethylene alkylphenyl ether, polyoxyethylene ester of aliphatic acid, sorbitan ester of aliphatic acid, polyoxyethylene sorbitan ester of aliphatic acid, or glycerin ester of an aliphatic acid; an anionic surfactant such as an aliphatic acid salt, a salt of alkyl sulfate ester, alkylbenzenesulfonate, alkylnaphthalenesulfonate, a salt of dialkylsulfosuccinate ester, a salt of alkyl phosphate ester, a condensate of naphthalene sulfonic acid with formalin, or a salt of a polyoxyethylene alkyl sulfate ester; and a cationic surfactant such as an alkylamine salt, quaternary ammonium salt, or polyoxyethylene alkylamine salt. Preferred surfactants are polyoxyethylene alkyl ether, polyoxyethylene alkylphenyl ether, a salt of a dialkylsulfosuccinate ester, a salt of an alkylphosphate ester and polyoxyethylene alkylamine salt because, like the above mentioned lipophilic substances, these surfactants are capable of minimizing the decrease in the lipophilicity of the image area of a lithographic printing plate. Polyoxyethylene alkylphenyl ether is particularly preferred. The above mentioned surfactants can be used independently or as a mixture. Of particular advantage is a combination of polyoxyethylene alkylphenyl ether and salt of dialkylsulfosuccinate ester which exhibits the combined effect of stabilizing an emulsion and minimizing the decrease in the lipophilicity of the image area. The surfactants are used in an amount within the range of from about 0.5 to about 10 wt%, preferably from 1 to 5 wt%, based on the total weight of the plate protective agent.

The hydrophilic high molecular weight compound contained in the aqueous phase of the plate protective agent according to this invention functions to protect the non-image area of a lithographic printing plate and it is preferably a film-forming water-soluble resin. Examples of the suitable film-forming hydrophilic high molecular weight compounds are dextrin, gum arabic, an alginate such as sodium alginate, a water soluble cellulose such as carboxymethylcellulose, hydroxyethylcellulose or methylcellulose, polyvinyl alcohol, polyvinyl pyrrolidone, polyacrylamide, a water soluble copolymer containing an acrylamide unit, a copolymer of vinyl methyl ether and maleic anhydride, or a copolymer of vinyl acetate and maleic anhydride. Particularly preferred are gum arabic, dextrin, polyvinyl pyrrolidone, carboxymethylcellulose and polyvinyl alcohol. Gum arabic is most preferred. These film-forming, hydrophilic high molecular weight compounds are used independently or as a mixture. Of special advantage is a gum arabic and dextrin combination which is able to enhance the hydrophilicity of the non-image area without reducing the lipophilicity of the image area. While these hydrophilic high molecular weight compounds may be contained in the aqueous phase in a wide range of concentrations, they are generally used in an amount within the range of from about 5 to about 40 wt%, preferably from 10 to 30 wt%, based on the total weight of the plate protective agent, and their concentration in the aqueous phase is in the range of from about 6 to about 60 wt%, preferably from 15 to 50 wt%.

The aqueous phase of the plate protective agent according to this invention preferably contains a wetting agent for the purpose of enabling the aqueous phase to spread suitably to the non-image area of the lithographic printing plate. A preferred wetting agent is a polyhydric alcohol, which is specifically exemplified by ethylene glycol, diethylene glycol, triethylene glycol, propylene glycol, butylene glycol, pentanediol, hexylene glycol, tetraethylene glycol, polyethylene glycol, dipropylene glycol, tripropylene glycol, glycerin, sorbitol or pentaerythritol. Glycerin is most preferred. These wetting agents are used in an amount of from about 0.5 to about 10 wt%, preferably from 1 to 5 wt%, based on the total weight of the plate protective agent.

The aqueous phase of the plate protective agent according to this invention preferably contains a water soluble salt for the purpose of enhancing the hydrophilicity of the non-image area of a lithographic printing plate when it is coated with the plate protective agent. Advantageous water soluble salts include an alkali metal salt and ammonium salt; particularly advantageous are water soluble alkali metal salts and ammonium salts of acids such as acetic acid, molybdic acid, boric acid, nitric acid, sulfuric acid, phosphoric acid and polyphosphoric acid. Specific examples are ammonium acetate, sodium acetate, potassium acetate, sodium molybdate, potassium molybdate, sodium borate, ammonium borate, lithium nitrate, sodium nitrate, potassium nitrate, sodium primary phosphate, sodium secondary phosphate, sodium tertiary phosphate, potassium primary phosphate, potassium secondary phosphate, potassium tertiary phosphate, ammonium tertiary phosphate, and sodium polyphosphate. Particularly preferred are potassium acetate, sodium borate, ammonium borate, potassium nitrate, sodium molybdate, potassium molybdate and potassium sulfate. Whether used independently or as a mixture, these water soluble salts are used in an amount of from about 0.05 to about 2 wt%, preferably from 0.1 to 1 wt%, based on the total weight of the plate protective agent.

If gum arabic is used as the hydrophilic high molecular weight compound to be dissolved in the aqueous phase of the plate protective agent, the pH of the aqueous phase is controlled to be acidic, preferably in the range of from 1 to 5, more preferably from 1 to 3. Therefore, if the aqueous phase is not acidic, an acid is used to render it acidic. Acids used for pH adjustment include a mineral acid such as phosphoric acid, sulfuric acid or nitric acid, and an organic acid such as citric acid, tannic acid, malic acid glacial acetic acid, lactic acid, oxalic acid or p-toluene sulfonic acid. Phosphoric acid is particularly advantageous because it not only functions as an agent to adjust the pH of the aqueous phase but it also prevents staining of the non-image area. These acids are used in an amount of from 0.1 to 8 wt%, preferably from 0.5 to 5 wt%, based on the total weight of the aqueous phase.

A typical example of the method of preparing the plate protective agent of this invention will hereunder be described.

First, a hydrophilic high molecular weight compound is dissolved in water to form an aqueous phase. If necessary, a wetting agent, water soluble salt and/or acid is added to the aqueous phase. Separately, a surfactant is dissolved in a plasticizer to form an oil phase. If necessary, a lipophilic substance is added to the oil phase. Dropwise the oil phase is added to the aqueous phase under stirring. A homogenizer is used to promote emulsification of the mixture until the protective agent of this invention is prepared.

While the plate protective agent of this invention can be used with a variety of lithographic printing plates, it is applied with advantage to a lithographic printing plate prepared by performing imagewise exposure and development of a presensitized lithographic printing plate (which is hereinafter referred to as PS plate) which comprises an aluminum substrate coated with a photosensitive layer.

PS plates which are of particular advantage to the object of this invention will hereunder be described in detail.

Aluminum plates which are advantageously used as a substrate include a pure aluminum plate and aluminum alloy plate as well as a plastic film laminated or metallized with aluminum. These aluminum plates are preferably subjected to surface treatment such as graining, immersion in an aqueous solution of sodium silicate, potassium fluorozirconate or phosphate, or anodization. Other advantageous substrates are an aluminum plate of the type described in U.S. Pat. No. 2,714,066 which is grained and thereafter immersed in an aqueous solution of sodium silicate, and an aluminum plate of the type described in U.S. Pat. No. 3,181,461 which is anodized before it is immersed in an aqueous solution of an alkali metal silicate. The anodization is carried out using an aluminum anode in an electrolyte comprising one or more aqueous or non-aqueous solutions of an inorganic acid such as phosphoric acid, chromic acid, sulfuric acid or boric acid, or an organic acid such as oxalic acid or sulfamic acid, or salts thereof.

The technique of electrodeposition with silicate as described in U.S. Pat. No. 3,658,662 can also advantageously be employed in this invention.

Another example of the advantageous substrate is an aluminum plate of the type described in U.S. Pat. No. 4,087,341, Japanese Patent Publication No. 27481/71 and Japanese Patent Application (OPI) No. 30503/77 (the term "OPI" as used herein refers to a "published unexamined Japanese patent application") which is first electrograined and then anodized in the manner described above. A further example is an aluminum plate of the type described in U.S. Pat. No. 3,834,998 which is grained, chemically etched and anodized as described above. The surface treatments are applied not only for the purpose of making the surface of the substrate hydrophilic but also for the purpose of preventing any adverse reaction with the photosensitive composition placed on the substrate and providing strong bond between the substrate and photosensitive layer.

Preferred examples of the composition that makes the photosensitive layer to be formed on these aluminum substrates include the following:

(1) Compositions composed of diazo resins

Diazo resins which are typified by a condensate of p-diazodiphenylamine and paraformaldehyde may be water soluble or insoluble, and they are preferably insoluble in water and soluble in conventional organic solvents. Particularly preferred diazo compounds are salts of a condensate of p-diazophenylamine and formaldehyde or acetaldehyde, such as a compound having two or more diazo groups in its molecule in the form of a phenolate, fluorocaprate or salts of sulfonic acids such as triisopropylnaphthalenesulfonic acid, 4,4-biphenyldisulfonic acid, 5-nitro-ortho-toluenesulfonic acid, 5-sulfosalicylic acid, 2,5-dimethylbenzenesulfonic acid, 2-nitrobenzenesulfonic acid, 3-chlorobenzenesulfonic acid, 3-bromobenzenesulfonic acid, 2-chloro-5-nitrobenzenesulfonic acid, 2-fluorocaprylnaphthalenesulfonic acid, 1-naphthol-5-sulfonic acid, 2-methoxy-4-hydroxy-5-benzoylbenzenesulfonic acid and paratoluenesulfonic acid. Other preferred diazo resins include a condensate of 2,5-dimethoxy-4-p-tolylmercaptobenzenediazonium and formaldehyde in the form of the salts illustrated above.

Another preferred example is the diazo resin described in British Pat. No. 1,312,925.

While these diazo resins may individually serve as a photosensitive material to be used for preparing a resist, they are preferably used in combination with a binder.

A variety of polymers can be used as the binder. A preferred binder contains a hydroxy, amino, carboxylic acid, amido, sulfone amide, active methylene, thioalcohol, epoxy and other groups. Examples of such preferred binders are: shellac of the type described in British Pat. No. 1,350,521; a polymer of the type described in British Pat. No. 1,460,978 and U.S. Pat. No. 4,125,276 which contains a hydroxyethyl acrylate or hydroxyethyl methacrylate unit as the predominant repeating unit; a polyamide resin of the type described in U.S. Pat. No. 3,751,257; a phenolic resin and a polyvinyl acetal resin such as polyvinyl formal resin or polyvinyl butyral which are of the type described in British Pat. No. 1,074,392; a linear polyurethane resin, polyvinyl alcohol resin esterified with phthalic acid, an epoxy resin prepared by condensing bisphenol A and epichlorohydrin, a polymer containing an amino group such as polyaminostyrene or polyalkyl amino (meth)acrylate, cellulose such as cellulose acetate, cellulose alkyl ether, cellulose acetate phthalate, which are of the type described in U.S. Pat. No. 3,660,097.

These binders are suitably contained in the photosensitive resist forming composition in an amount of from 40 to 95 wt%. Higher binder content (in other words, lower diazo resin content) of course results in greater sensitivity but this is compromised by low time-dependent stability. Optimum content of the binder is in the range of from about 70 to 90 wt%.

Compositions composed of these diazo resins may optionally contain other additives such as phosphoric acid, a dye and a pigment as described in U.S. Pat. No. 3,236,646.

(2) Compositions composed of o-quinonediazide compounds

A particularly preferred o-quinonediazide compound is an o-naphthoquinonediazide compound of the type described in U.S. Pat. Nos. 2,766,118; 2,767,092; 2,772,972; 2,859,112; 2,907,665; 3,046,110; 3,046,111; 3,046,115; 3,046,118; 3,046,119; 3,046,120; 3,046,121; 3,046,122; 3,046,123; 3,061,430; 3,102,809; 3,106,465; 3,635,709; 3,647,443 and many other publications. Particularly preferred are and o-naphthoquinonediazidosulfonic acid ester or an o-naphthoquinonediazidocarboxylic acid ester of an aromatic hydroxy compound, and an o-naphthoquinonediazidosulfonamide or o-naphthoquinonediazidocarboxylic acid amide of an aromatic amino compound. Very effective compounds are a condensate of pyrogallol and acetone esterified with o-naphthoquinonediazidosulfonic acid as described in U.S. Pat. No. 3,635,709; a polyester having a terminal hydroxy group esterified with o-naphthoquinonediazidosulfonic acid or o-naphthoquinonediazidocarboxylic acid as described in U.S. Pat. No. 4,028,111 and; a homopolymer of p-hydroxystyrene or a copolymer thereof with another copolymerizable monomer which is esterified with o-naphthoquinonediazidosulfonic acid or o-naphthoquinonediazidocarboxylic acid as described in U.S. Pat. No. 4,139,384.

While these o-quinonediazide compounds can be used independently, they are preferably used as a mixture with an alkali-soluble resin. A suitable alkali-soluble resin includes a novolak type phenolic resin such as a phenolformaldehyde resin, o-cresol-formaldehyde resin or m-cresolformaldehyde resin. More preferably, these phenolic resins are used in combination with a tert-butylphenol-formaldehyde resin which is a condensate of formaldehyde and phenol or cresol substituted by an alkyl group having 3 to 8 carbon atoms, as described in U.S. Pat. No. 4,123,279. These alkali-soluble resins are contained in the photosensitive resist forming composition in an amount of from about 50 to 85 wt%, preferably from 60 to 80 wt%, based on the total weight of said composition.

Photosensitive compositions composed of these o-quinonediazide compounds may optionally contain other additives such as pigment, dye and plasticizer.

(3) Compositions composed of photosensitive azide compounds

A suitable photosensitive azide compound is an aromatic azide compound wherein an azido group is bonded to the aromatic ring either directly or through a carbonyl group or sulfonyl group. Upon exposure to light, the azido group of the compound is decomposed to form nitrene which enters into various reactions that insolubilize the compound. A preferred aromatic azide compound contains one or more groups such as azidophenyl, azidostyryl, azidobenzal, azidobenzoyl and azidocinnamoyl; specific examples are 4,4'-diazidochalcone, 4-azido-4'-(azidobenzoylethoxy) chalcone, N,N-bis-p-azidobenzal-p-phenylenediamine, 1,2,6-tri(4'-azidobenzoxy)hexane, 2-azido-3-chloro-benzoquinone, 2,4-diazido-4'-ethoxy-azobenzene, 2,6-di(4'-azidobenzal)-4-methylcyclohexane, 4,4'-diazidobenzophenone, 2,5-diazido-3,6-dichlorobenzoquinone, 2,5-bis(4-azidostyryl)-1,3,4-oxadiazole, 2-(4-azidocinnamoyl)thiophene, 2,5-di(4'-azidobenzal)cyclohexanone, 4,4'-diazidophenylmethane, 1-(4-azidophenyl)-5-furyl-2-penta-2,4-dien-1-one, 1-(4-azidophenyl)-5-(4-methoxyphenyl)-penta-1,4-dien-3-one, 1-(4-azidophenyl)-3-(1-naphthyl)-propen-1-one, 1-(4-azidophenyl)-3-(4-dimethylaminophenyl)-propan-1-one, 1-(4-azidophenyl)-5-phenyl-1,4-pentadien-3-one, 1-(4-azidophenyl)-3-(4-nitrophenyl)-2-propen-1-one, 1-(4-azidophenyl)-3-(2-furyl)-2-propen-1-one, 1,2,6-tri(4'-azidobenzoxy)hexane, 2,6-bis-(4-azidobenzylidyene-p-t-butyl)cyclohexanone, 4,4'-diazidobenzalacetone, 4,4'-diazidostilbene-2,2'-disulfonic acid, 4'-azidobenzalacetophenone-2-sulfonic acid, 4,4'-diazidostilbene-α-carboxylic acid, di-(4-azido-2'-hydroxybenzal)acetone-2-sulfonic acid, 4-azidobenzalacetophenone-2-sulfonic acid, 2-azido-1,4-dibenzenesulfonylaminonaphthalene, or 4,4-diazide-stilbene-2,2'-disulfonic acid anilide.

These low-molecular-weight aromatic diazide compounds may advantageously be replaced by the azido-containing polymer which is illustrated in Japanese Patent Publications Nos. 9047/69; 3.387/69; 9613/70; 24915/70; 25713/70; Japanese Patent Application (OPI) Nos. 5102/75; 84302/75; 84303/75; and 12984/78.

The above defined photosensitive azide compounds are preferably used in combination with a polymer which works as a binder. A preferred binder is an alkali-soluble resin. Examples of the alkali-soluble resin include: a natural resin such as shellac or rosin; a novolak type phenolic resin such as phenol-formaldehyde resin or m-cresol-formaldehyde resin; a homopolymer of an unsaturated carboxylic acid or a copolymer thereof with another copolymerizable monomer, such as polyacrylic acid, polymethacrylic acid a, methacrylic acid-styrene copolymer a, methacrylic acid-methyl acrylate copolymer or a styrene-maleic anhydride copolymer; a resin produced by reacting a partial or complete saponification product of polyvinyl acetate with an aldehyde such as acetaldehyde, benzaldehyde, hydroxybenzaldehyde or carboxybenzaldehyde or form partial acetal; and polyhydroxystyrene. Other suitable examples of the binder are organic solvent soluble resins such as cellulose alkyl ethers typified by cellulose methyl ether and cellulose ethyl ether.

The binder is preferably contained in an amount of from about 10 to about 90 wt% based on the total weight of the composition composed of the photosensitive azide compound.

Compositions composed of the photosensitive azide compound may optionally contain a dye, pigment, a plasticizer such as a phthalate ester, phosphate ester, aliphatic carboxylic acid ester, glycol or sulfonamide, and a sensitizer such as Michlers ketone, 9-fluorenone, 1-nitropyrene, 1,8-dinitropyrene, 2-chloro-1,2-benzanthraquinone, 2-bromo-1,2-benzanthraquinone, pyrene-1,6-quinone, 2-chloro-1,8-phthaloylnaphthalene, or cyanoacridine.

While the basic structure of the PS plate that is suitable for the purpose of this invention is composed of an aluminum substrate overlaid with a photosensitive layer made of the photosensitive materials described above, the photosensitive layer may optionally be coated with one or more resin layers such as specifically described in U.S. Pat. No. 3,136,637 wherein the substrate is overlaid with, in the order written, a photosensitive layer, a lipophilic resin layer, a hydrophobic resin layer a, water insoluble resin layer and another layer of resin which is softened by a solvent. A PS plate of similar structure is described in British Pat. Nos. 1,478,333 and 1,478,334 and this structure is also included within the scope of this invention.

The following description illustrates how the plate protective agent of this invention is applied to a PS plate in one preferred embodiment.

First, a PS plate is subjected to imagewise exposure and development to make a lithographic printing plate. The resulting plate is washed with water, the water on the plate removed with a squeegee, a suitable amount of the protective agent is poured on the plate, and a sponge is used to spread the agent to cover the entire surface of the plate. As a result of these procedures, the non-image area of the plate is protected in such a manner that the lithographic printing plate can withstand extended storage. The plate is washed with water to remove the gum before the conventional printing procedure starts.

The plate protective agent of this invention hardly decreases the lipophilicity of the image of a lithographic printing plate whereas it is capable of enhancing the hydrophilicity of the non-image area. In addition, unlike the protective agent of conventional type which uses a petroleum fraction as a solvent for the oil phase, the protective agent of this invention does not spoil the non-image area of a lithographic printing plate nor does it emit the odor characteristic of a petroleum fraction.

The protective agent of this invention works most effectively when it is applied to a lithographic printing plate prepared from the PS plate described in either British Pat. Nos. 1,460,978 or 1,505,739.

This invention will hereunder be described in greater detail by reference to the following Examples wherein all percents are by weight.

EXAMPLES 1 TO 4 AND COMPARATIVE EXAMPLES 1 TO 5

A 0.24 mm thick aluminum substrate was degreased by immersion in a 7% aqueous solution of sodium tertiary phosphate at 60° C., and after water washing, a suspension of pumice in water was poured on the substrate while it was grained by rubbing with a nylon brush. After washing with water, the grained substrate was immersed for a period of 30 to 60 seconds in a 5% aqueous solution of sodium silicate JIS No. 3 (molar ratio of $SiO_2$ to $Na_2O = 3.1$ to 3.3) which was controlled at 70° C.

After thorough washing with water, the substrate was dried and coated with a sensitive solution of the following formulation.

| Photosensitive Composition | |
|---|---|
| A copolymer of 2-hydroxyethyl methacrylate (as synthesized according to the method described in Example 1 of U.S. Pat. No. 4,123,276) | 0.87 g |
| Salt of 2-methoxy-4-hydroxy-5-benzoylbenzenesulfonic acid with a condensate of p-diazodiphenylamine and paraformaldehyde | 0.1 g |
| Oil Blue #603 (C.I. 74350, a product of Orient Chemical Industries Co., Ltd.) | 0.03 g |
| 2-Methoxyethanol | 6 g |
| Methanol | 6 g |
| Ethylene dichloride | 6 g |

The sensitive solution was applied such that the dry coating weight was 1.0 g/m$^2$. The thus prepared photosensitive lithographic printing plate was exposed to seasonal conditions for a period of 1 year during which it was subjected to the effect of heat and moisture. The plate was exposed imagewise for a period of 40 seconds to a metal halide lamp of 3 KW placed at a distance of 1 m. Subsequently, the plate was immersed in a developing solution of the following formulation at room temperature for a period of 1 minute, and the surface of the plate was lightly rubbed with absorbent cotton to remove the unexposed area. The product was a lithographic printing plate.

| Developer Solution | |
|---|---|
| Benzyl alcohol | 3.0 g |
| Sodium isopropyl-naphthalenesulfonate | 1.0 g |
| Sodium silicate (40% aqueous solution) | 1.0 g |
| Water | 95 g |

An aqueous solution A of the following formulation was prepared, a solution B of another formulation set forth below as gradually added to the aqueous solution A under vigorous stirring, and the resulting emulsion was subjected to further emulsification using a homogenizer until the plate protective agent of this invention was produced.

| | |
|---|---|
| Aqueous Solution A | |
| Gum arabic | 4 g |
| Dextrin | 16 g |
| Phosphoric acid (85%) | 0.2 g |
| Water | 75 g |
| Solution B | |
| Sodium dilauryl sulfosuccinate | 1.0 g |
| Rosin ester (a product of Arakawa Chemical Co., Ltd.) | 0.5 g |
| Solvent (see Table 1 below) | 3.0 g |

The previously prepared lithographic printing plate was washed with water, the excess water was removed with a squeegee, a small amount of the protective agent was poured dropwise thereon and a sponge was used to spread the agent so as to cover the entire surface of the printing plate. Subsequently, the plate was washed with water to remove the protective agent from its surface and set on a printing machine for printing. The plate protective agent was checked for any odor it would emit when it was applied to the lithographic printing plate and for any stain that would be formed on the resulting printed matter. The results of the checking are indicated in Table 1 below.

TABLE 1

| Run No. | Solvent | Odor | Stain |
|---|---|---|---|
| Example 1 | Dioctyl phthalate | none | none |
| Example 2 | Dibutyl phthalate | " | " |
| Example 3 | Epoxidized soybean oil | " | " |
| Example 4 | Benzyl benzoate | faint | " |
| Comparative Example 1 | n-Amyl alcohol | yes | light |
| Comparative Example 2 | Benzyl alcohol | " | " |
| Comparative Example 3 | n-Amyl acetate | strong | " |
| Comparative Example 4 | K-Solvent | light | stained |
| Comparative Example 5 | Toluene | " | lightly stained |

Table 1 indicates that the plate protective agent of this invention emits little or no odor and that the lithographic printing plate treated with it can provide unstained printed matter.

EXAMPLE 5

A mechanically grained 2S aluminum substrate was partially etched by immersion in a 2% aqueous solution of sodium hydroxide at 40° C. for a period of 1 minute. After washing with water, the aluminum substrate was immersed in a mixture of sulfuric acid and chromic acid for a period of about 1 minute to expose the surface of pure aluminum. The substrate was then immersed in 20% sulfuric acid at 30° C., and subjected to anodization at a D.C. voltage of 1.5 V and a current density of 3 A/dm$^2$, followed by washing with water and drying. Subsequently, a roll coater was used to coat continuously the substrate with a sensitive solution of the following formulation until the dry coating weight was 2 g/m$^2$.

| Photosensitive Solution | |
|---|---|
| Naphthoquinone-1,2-diazide(2)-5-sulfonic acid ester of acetone-pyrrogallol resin (as synthesized according to the method described in Example 1 of U.S. Pat. No. 3,635,709) | 5 g |
| PR-50530 (tertiary-butylphenol/formaldehyde resin manufactured by Sumitomo Durez Co., Ltd.) | 0.5 g |
| Hitanol #3110 (cresol/formaldehyde resin manufactured by Hitachi Chemical Co., Ltd.) | 5 g |
| Methyl ethyl ketone | 50 g |
| Cyclohexanone | 40 g |

The plate dried at 100° C. for a period of 2 minutes had the performance of a PS plate which could be stored in a cool dark place for a period of 1 year without any significant deterioration in its quality. The thus presensitized lithographic printing plate was set in a vacuum printing frame and exposed to a Fuji Film PS Light (having the 3 KW light source from Toshiba Metal Halide Lamp MU 2000-2-OL and sold by Fuji Photo Film Co., Ltd.) through a positive film for a period of 30 seconds. Subsequently, the plate was immersed in a developing solution of the following formulation.

| Developer Solution | |
|---|---|
| Sodium silicate JIS No. 3 | 10 g |
| Aerosol OS (sodium isopropylnaphthalene-sulfonate manufactured by American Cyanamide Co.) | 20 g |
| Benzyl alcohol | 30 g |
| Water added to make 1000 ml | |

The resultant lithographic printing plate was washed with water, the water was removed by squeegee the plate, gummed with one of the three protective agents indicated in Table 2 below and dried at 80° C. for a period of 5 minutes. The three printing plates were allowed to stand at a temperature of 20° C. for a period of 7 days, washed with water to remove the protective agent from their surface, used to print according to conventional procedures, and the number of sheets spent before printed matter having satisfactory density of printing ink was obtained (the number will hereunder be referred to as the number of wasted sheets) was counted and any stained non-image area of the printed matter was checked. The results of evaluation are shown in Table 2.

TABLE 2

| Protective agent | Solution A | Example 2 | Comparative Example 2 |
|---|---|---|---|
| No. of wasted sheets | 15 | 3 | 5 |
| Stain | none | none | some |

The above results show that the protective agent of this invention does not decrease the lipophilicity of the image area of the printing plate while enhancing the hydrophilicity of the non-image area nor does it produce any stain on the non-image area.

EXAMPLE 6

The procedure of Example 1 was repeated to prepare lithographic printing plates. The plates were gummed with three plate protective agents of the following formulations, washed with water, and used for printing according to the conventional procedures. The number of wasted sheets was counted and any stain formed on the non-image area was checked. In addition, each protective agent was left to stand in a container for the purpose of evaluating the stability of the emulsion. The results of counting, checking and evaluation are given in Table 3 below.

Plate Protective Agent Formulation

No. 1: the same as used in Example 2.

No. 2: the same as No. 1 above except that the sodium dilaurylsulfosuccinate of Solution B was replaced by an equal amount of polyoxyethylene nonylphenyl ether.

No. 3: the same as No. 1 above except that half the sodium dilaurylsulfosuccinate of Solution B was replaced by 0.5 g of polyoxyethylene nonylphenyl ether.

TABLE 3

| Protective agent | No. 1 | No. 2 | No. 3 |
|---|---|---|---|
| No. of wasted sheets | 10 | 10 | 5 |
| Stain | none | none | none |
| Emulsion stability | partial phase separation occurred in 2 days | partial phase separation occurred in 2 days | remained stable at the end of the 20th day |

The above results show that an emulsifying agent consisting of a mixture of sodium dilauryl sulfosuccinate and polyoxyethylene nonylphenyl ether provides an emulsion which is more stable by far than independent use of individual emulsifiers and which does not decrease the lipophilicity of the image area of a lithographic printing plate.

EXAMPLE 7

The procedure of Example 1 was repeated to prepare lithographic printing plates. The plates were gummed with three plate protective agents of the same formulation as Example 1 except for the dibutylsebacate content. Each protective agent was prepared by emulsifying a mixture of the following two solutions in the same manner as in Example 1.

| Aqueous Solution A | |
|---|---|
| Gum arabic | 4 g |
| Dextrin | 16 g |
| Phosphoric acid (80%) | 0.2 g |
| Water | 75 g |

-continued

| Solution B | |
|---|---|
| Sodium dilaurylsulfosuccinate | 1.0 g |
| Rosin ester (a product of Arakawa Chemical Co., Ltd.) | 0.5 g |
| Dibutyl sebacate See Table 4 below for its content. | |

Each protective agent was checked for stickiness of a gummed plate as well as for the number of wasted sheets and stain on the non-image area as in Example 1. The results are shown in Table 4 below.

TABLE 4

| Protective Agent | No. 1 | No. 2 | No. 3 |
|---|---|---|---|
| Dibutyl sebacate content (g) | 0.05 | 3.0 | 20.0 |
| Stickiness | none | none | yes |
| No. of wasted sheets | 5 | 3 | 3 |
| Stain | none | none | light |

The above results show that higher content of the plasticizer results not only in a sticky gummed plate but in stained printed matter, whereas lower plasticizer content is accompanied by a decrease in the lipophilicity of the image area of a lithographic printing plate.

While the invention has been described in detail and with reference to specific embodiments thereof, it will be apparent to one skilled in the art that various changes and modifications can be made therein without departing from the spirit and scope thereof.

What is claimed is:

1. In an agent for protecting the surface of a lithograpic printing plate which is an emulsion comprising an oil phase comprising a surfactant, and an aqueous phase having dissolved therein a hydrophilic high molecular compound, the improvement wherein said oil phase further comprises a plasticizer having a solidifying point of 15° C. or less, which is present in an amount of from about 0.1 to at 10 wt% based on the total amount of said agent.

2. The agent of claim 1, wherein said plasticizer boils at a temperature at least about 200° C. at atmospheric pressure.

3. The agent of claim 1, wherein said plasticizer is selected from the group consisting of phthalic acid diesters, aliphatic esters of dibasic acids, epoxidized triglycerides, phosphate esters, and benzoic esters.

4. The agent of claim 1, wherein said plasticizer is selected from the group consisting of dibutyl phthalate, diheptyl phthalate, di-n-octyl phthalate, di(2-ethylhexyl)-phthalate, dinonyl phthalate, didecyl phthalate, dilauryl phthalate, and butylbenzyl phthalate.

5. The agent of claim 1, wherein said plasticizer is selected from the group consisting of dioctyl adipate, butylglycol adipate, dioctyl azelate, dibutyl sebacate, di(2-ethylhexyl)sebacate, and dioctyl sebacate.

6. The agent of claim 5, wherein said plasticizer is selected from the group consisting of dioctyl adipate, dibutyl sebacate, and dioctyl azelate.

7. The agent of claim 1, wherein said oil phase additionally contains a lipophilic substance.

8. The agent of claim 7, wherein said lipophilic substance is selected from the group consisting of a novolak phenolic resin, a xylene resin, a resin prepared by condensing phenol and mesitylene with formaldehyde; polyhydroxystyrene; brominated polyhydroxystyrene, cashew resin; partially esterified styrene maleic anhydride copolymer; melamine resin; alkyd resin; polyester resin; epoxy resin; rosin or modified rosin; and a petroleum resin.

9. The agent of claim 7, wherein said lipophilic substance is an aliphatic carboxylic acid having 5 to 25 carbon atoms.

10. The agent of claim 1, wherein said surfactant is at least one of a nonionic surfactant, an anionic surfactant and a cationic surfactant.

11. The agent of claim 10, wherein said surfactant is selected from the group consisting of polyoxyethylene alkyl ether, polyoxyethylene alkylphenyl ether, a polyoxyethylene ester of an aliphatic acid, a sorbitan ester of an aliphatic acid, a polyoxyethylene sorbitan ester of an aliphatic acid, a glycerin ester of an aliphatic acid, an aliphatic acid salt, an alkyl sulfate ester, an alkylbenzenesulfonate, an alkylnaphthylenesulfonate, a dialkylsulfosuccinate ester, an alkylphosphate ester, a condensate of naphthalenesulfonic acid with formalin, a polyoxyethylene alkyl sulfate ester, a quaternary ammonium salt, an alkylamine salt, and a polyoxyethylene alkylamine salt.

12. The agent of claim 11, wherein said surfactant is selected from the group consisting of polyoxyethylene alkyl ether, polyoxyethylene alkylphenyl ether, dialkylsulfosuccinate ester, alkyl phosphate ester and polyoxyethylene alkylamine salt.

13. The agent of claim 1, wherein said surfactant is present in an amount of about 0.5 to 10 weight % based on the weight of said agent.

14. The agent of claim 1, wherein said hydrophilic high molecular weight compound is selected from the group consisting of dextrin, gum arabic, an alginate, a water soluble cellulose, polyvinyl alcohol, polyvinyl pyrrolidone, polyacrylamide, an acrylamide copolymer, a vinylmethyl ether-maleic anhydride copolymer and a vinyl acetate-maleic anhydride copolymer.

15. The agent of claim 14, wherein said hydrophilic high molecular weight compound is selected from the group consisting of gum arabic, dextrin, polyvinyl pyrrolidone, carboxymethyl cellulose and polyvinyl alcohol.

16. The agent of claim 15, wherein said hydrophilic high molecular weight compound is gum arabic.

17. The agent of claim 14, wherein said hydrophilic high molecular weight compound is a combination of gum arabic and dextrin.

18. The agent of claim 1, wherein said hydrophilic high molecular weight compound is present in an amount of about 5 to 40 weight %.

19. The agent of claim 1, wherein said aqueous phase additionally contains a wetting agent capable of enhancing the spreadability of the aqueous phase.

20. The agent of claim 19, wherein said wetting agent is a polyhydric alcohol.

21. The agent of claim 1, wherein said aqueous phase additionally contains a water soluble salt.

22. The agent of claim 21, wherein said water soluble salt is an alkali metal salt or an ammonium salt.

23. In a gumming process which comprises coating a protective solution on a lithographic printing plate consisting of a non-image area which retains water and repels a greasy printing ink, and an image-area which repels water and accepts said greasy printing ink, wherein said protective solution comprises an oil phase comprising an organic solvent which dissolves a surfactant and an aqueous phase having dissolved therein a hydrophilic high molecular weight compound, the improvement wherein the said organic solvent comprises a plasticizer having a solidifying point of 15° C. of less, which is present in an amount of from about 0.1 to about 10 wt.% based on the total amount of said agent.

24. The process of claim 23, wherein said lithographic printing plate is prepared from a presensitized plate.

25. The agent of claim 1, wherein said surfactant is present in an amount from 0.5 to 5 wt.% based on the total weight of the agent.

26. In an agent for protecting the surface of a lithographic printing plate which is an emulsion comprising an oil phase containing a solvent and a surfactant, and an aqueous phase having dissolved therein a hydrophilic high molecular weight compound, the improvement wherein said solvent consists of a plasticizer having a solidifying point of 15° C. or less which is present in an amount of from about 0.1 to about 10 wt.% based on the total amount of said agent.

27. The agent of claim 26, wherein said plasticizer boils at a temperature at least about 200° C. at atmospheric pressure.

28. The agent of claim 26, wherein said plasticizer is selected from the group consisting of phthalic acid diesters, aliphatic esters of dibasic acids, epoxidized triglycerides, phosphate esters, and benzoic esters.

29. The agent of claim 26, wherein said plasticizer is selected from the group consisting of dibutyl phthalate, diheptyl phthalate, di-n-octyl phthalate, di(2-ethylhexyl)-phthalate, dinonyl phthalate, didecyl phthalate, dilauryl phthtalate, and butylbenzyl phthalate.

30. The agent of claim 26, wherein said plasticizer is selected from the group consisting of dioctyl adipate, butylglycol adipate, dioctyl azelate, dibutyl sebacate, di(2-ethylhexyl)sebacate, and dioctyl sebacate.

31. The agent of claim 30, wherein said plasticizer is selected from the group consisting of dioctyl adipate, dibutyl sebacate, and dioctyl azelate.

32. The agent of claim 26, wherein said oil phase additionally contains a lipophilic substance.

33. The agent of claim 32, wherein said lipophilic substance is selected from the group consisting of a novolak phenolic resin, a xylene resin, a resin prepared by condensing phenol and mesitylene with formaldehyde; polyhydroxystyrene; brominated polyhydroxystyrene, cashew resin; partially esterified styrene maleic anhydride copolymer; melamine resin; alkyd resin; polyester resin; epoxy resin; rosin or modified rosin; and a petroleum resin.

34. The agent of claim 32, wherein said surfactant is at least one of a nonionic surfactant, an anionic surfactant and a cationic surfactant.

35. The agent of claim 26, wherein said surfactant is at least one of a nonionic surfactant, an anionic surfactant and a cationic surfactant.

36. The agent of claim 35, wherein said surfactant is selected from the group consisting of polyoxyethylene alkyl ether, polyoxyethylene alkylphenyl ether, a polyoxyethylene ester of an aliphatic acid, a sorbitan ester of an aliphatic acid, a polyoxyethylene sorbitan ester of an aliphatic acid, a glycerin ester of an aliphatic acid, an aliphatic acid salt, an alkyl sulfate ester, an alkylbenzenesulfonate, an alkylnaphthylenesulfonate, a dialkylsulfosuccinate ester, an alkylphosphate ester, a condensate of naphthalene sulfonic acid with formalin, a polyoxyethylene alkyl sulfate ester, a quaternary ammonium salt, an alkylamine salt, and a polyoxyethylene alkylamine salt.

37. The agent of claim 36, wherein said surfactant is selected from the group consisting of polyoxyethylene alkyl ether, polyoxyethylene alkylphenyl ether, a dialkylsulfosuccinate ester, alkyl phosphate ester and polyoxyethylene alkylamine salt.

38. The agent of claim 26, wherein said surfactant is present in an amount of about 0.5 to 10 wt.% based on the weight of said agent.

39. The agent of claim 26, wherein said hydrophilic high molecular weight compound is selected from the group consisting of dextrin, gum arabic, an alginate, a water soluble cellulose, polyvinyl alcohol, polyvinyl pyrrolidone, polyacrylamide, an acrylamide copolymer, a vinylmethyl ether-maleic anhydride copolymer and a vinyl acetate-maleic anhydride copolymer.

40. The agent of claim 39, wherein said hydrophilic high molecular weight compound is selected from the group consisting of gum arabic, dextrin, polyvinyl pyrrolidone, carboxymethyl cellulose and polyvinyl alcohol.

41. The agent of claim 40, wherein said hydrophilic high molecular weight compound is gum arabic.

42. The agent of claim 39, wherein said hydrophilic high molecular weight compound is a combination of gum arabic and dextrin.

43. The agent of claim 26, wherein said hydrophilic high molecular weight compound is present in an amount of about 5 to 40 wt.%.

44. The agent of claim 26, wherein said aqueous phase additionally contains a wetting agent capable of enhancing the spreadability of the aqueous phase.

45. The agent of claim 44, wherein said wetting agent is a polyhydric alcohol.

46. The agent of claim 26, wherein said aqueous phase additionally contains a water soluble salt.

47. The agent of claim 46, wherein said water soluble salt is an alkali metal salt or an ammonium salt.

48. The agent of claim 26, wherein said surfactant is present in an amount of from 0.5 to 5 wt.% based on the total weight of the agent.

49. The process of claim 23, wherein said plasticizer boils at a temperature at least about 200° C. at atmospheric pressure.

50. The process of claim 23, wherein said plasticizer is selected from the group consisting of phthalic acid diesters, aliphatic esters of dibasic acids, epoxidized triglycerides, phosphate esters, and benzoic esters.

51. The process of claim 23, wherein said plasticizer is selected from the group consisting of dibutyl phthalate, diheptyl phthalate, di-n-octyl phthalate, di(2-ethylhexyl)-phthalate, dinonyl phthalate, didecyl phthalate, dilauryl phthtalate, and butylbenzyl phthalate.

52. The process of claim 23, wherein said plasticizer is selected from the group consisting of dioctyl adipate, butylglycol adipate, dioctyl azelate, dibutyl sebacate, di(2-ethylhexyl)sebacate, and dioctyl sebacate.

53. The process of claim 52, wherein said plasticizer is selected from the group consisting of dioctyl adipate, dibutyl sebacate, and dioctyl azelate.

54. The process of claim 23, wherein said oil phase additionally contains a lipophilic substance.

55. The process of claim 54, wherein said lipophilic substance is selected from the group consisting of a novolak phenolic resin, a xylene resin, a resin prepared by condensing phenol and mesitylene with formaldehyde; polyhydroxystyrene; brominated polyhydroxystyrene, cashew resin; partially esterified styrene maleic anhydride copolymer; melamine resin; alkyd resin; polyester resin; epoxy resin; rosin or modified rosin; and a petroleum resin.

56. The process of claim 54, wherein said surfactant is at least one of a nonionic surfactant, an anionic surfactant and a cationic surfactant.

57. The process of claim 23, wherein said surfactant is at least one of a nonionic surfactant, an anionic surfactant and a cationic surfactant.

58. The process of claim 57, wherein said surfactant is selected from the group consisting of polyoxyethylene alkyl ether, polyoxyethylene alkylphenyl ether, a polyoxyethylene ester of an aliphatic acid, a sorbitan ester of an aliphatic acid, a polyoxyethylene sorbitan ester of an aliphatic acid, a glycerin ester of an aliphatic acid, an aliphatic acid salt, an alkyl sulfate ester, an alkylbenzenesulfonate, an alkylnaphthylenesulfonate, a dialkylsulfosuccinate ester, an alkylphosphate ester, a condensate of naphthalene sulfonic acid with formalin, a polyoxyethylene alkyl sulfate ester, a quaternary ammonium salt, an alkylamine salt, and a polyoxyethylene alkylamine salt.

59. The process of claim 58, wherein said surfactant is selected from the group consisting of polyoxyethylene alkyl ether, polyoxyethylene alkylphenyl ether, a dialkylsulfosuccinate ester, alkyl phosphate ester and polyoxyethylene alkylamine salt.

60. The process of claim 23, wherein said surfactant is present in an amount of about 0.5 to 10 wt.% based on the weight of said agent.

61. The process of claim 23, wherein said hydrophilic high molecular weight compound is selected from the group consisting of dextrin, gum arabic, an alginate, a water soluble cellulose, polyvinyl alcohol, polyvinyl pyrrolidone, polyacrylamide, an acrylamide copolymer, a vinylmethyl ether-maleic anhydride copolymer and a vinyl acetate-maleic anhydride copolymer.

62. The process of claim 61, wherein said hydrophilic high molecular weight compound is selected from the group consisting of gum arabic, dextrin, polyvinyl pyrrolidone, carboxymethyl cellulose and polyvinyl alcohol.

63. The process of claim 62, wherein said hydrophilic high molecular weight compound is gum arabic.

64. The process of claim 61, wherein said hydrophilic high molecular weight compound is a combination of gum arabic and dextrin.

65. The process of claim 23, wherein said hydrophilic high molecular weight compound is present in an amount of about 5 to 40 wt.%.

66. The process of claim 23, wherein said aqueous phase additionally contains a wetting agent capable of enhancing the spreadability of the aqueous phase.

67. The process of claim 66, wherein said wetting agent is a polyhydric alcohol.

68. The process of claim 23, wherein said aqueous phase additionally contains a water soluble salt.

69. The process of claim 68, wherein said water soluble salt is an alkali metal salt or an ammonium salt.

70. The process of claim 23, wherein said surfactant is present in an amount of from 0.5 to 5 wt.% based on the total weight of the agent.

71. Th process of claim 23, wherein said organic solvent consists of a plasticizer having a solidifying point of 15° C. or less.

72. The agent of claim 1, wherein said oil phase consists essentially of said surfactant and said plasticizer.

73. The process of claim 23, wherein said oil phase consists essentially of said surfactant and said plasticizer.

* * * * *